(12) United States Patent
Zhang

(10) Patent No.: US 11,790,752 B2
(45) Date of Patent: Oct. 17, 2023

(54) SECURITY DEVICE WITH ACTIVATION BACKING

(71) Applicant: Edge Security Products, LLC, Waxhaw, NC (US)

(72) Inventor: Ningsheng Zhang, Waxhaw, NC (US)

(73) Assignee: Edge Security Products, LLC, Waxhaw, NC (US)

( * ) Notice: Subject to any disclaimer, the term of this patent is extended or adjusted under 35 U.S.C. 154(b) by 0 days.

(21) Appl. No.: 17/890,536

(22) Filed: Aug. 18, 2022

(65) Prior Publication Data

US 2023/0059956 A1    Feb. 23, 2023

Related U.S. Application Data

(60) Provisional application No. 63/234,494, filed on Aug. 18, 2021.

(51) Int. Cl.
*G08B 21/18* (2006.01)
*G06K 19/07* (2006.01)

(52) U.S. Cl.
CPC .......... *G08B 21/18* (2013.01); *G06K 19/0723* (2013.01)

(58) Field of Classification Search
CPC ............................. G08B 21/18; G06K 19/0723
USPC ........................................................ 235/492
See application file for complete search history.

(56) References Cited

U.S. PATENT DOCUMENTS

| | | | | |
|---|---|---|---|---|
| 6,621,415 B1* | 9/2003 | Willis | ................ | G08B 13/1463 340/568.1 |
| 8,284,062 B2 | 10/2012 | Wyatt et al. | | |
| 9,489,808 B1* | 11/2016 | Wang | ..................... | G08B 21/18 |
| 2009/0289774 A1* | 11/2009 | Choi | ................ | G06K 19/07345 340/10.5 |
| 2012/0229975 A1* | 9/2012 | Yang | .................. | G08B 13/2434 361/728 |
| 2013/0241731 A1* | 9/2013 | Fawcett | ............. | G08B 13/1445 340/568.2 |
| 2015/0287299 A1 | 10/2015 | Eckert et al. | | |
| 2017/0193771 A1 | 7/2017 | Will et al. | | |
| 2022/0139178 A1* | 5/2022 | Zhang | ................ | G08B 13/1463 340/571 |

* cited by examiner

*Primary Examiner* — Michael G Lee
*Assistant Examiner* — David Tardif
(74) *Attorney, Agent, or Firm* — BURR & FORMAN LLP

(57) ABSTRACT

A security device includes a plunger switch with a plunger that moves to extend through an aperture in the housing and a removable protective backing coupled to an adhesive pad that initially maintains the plunger in the depressed position and the security device in an inventory state. In the inventory state, processing circuitry of the security device is configured to take no action in response to a deactivator sensor detecting a deactivator sign. The processing circuitry being configured to control operation of a sounder based on a current state of the processing circuitry and signaling from the plunger switch.

13 Claims, 8 Drawing Sheets

SECURITY DEVICE WITH ACTIVATION BACKING

CROSS REFERENCE TO RELATED APPLICATIONS

This application claims priority to U.S. application No. 63/234,494 filed Aug. 18, 2021, the entire contents of which are hereby incorporated by reference in their entirety.

TECHNICAL FIELD

Example embodiments generally relate to security technology and, in particular, relate to security devices that include audible alarming features and can be attached to an item or product to provide, for example, theft security and deterrence for the item or product.

BACKGROUND

Frequently in retail settings, product security tags and other devices attached to products or product packaging are commonly used to deter and intercept theft activities. Such devices operate to deter theft by notifying retailers that a theft event may be occurring. Systems, often referred to as electronic article surveillance (EAS) systems, use pedestals or towers that form an EAS gate located at the exits of a retail establishment that include antennas for detecting RF signals emitted by a product security device that is affixed to a product for sale. Such an EAS gate may sound an alarm in response to receipt of the RF signals to indicate that a possible theft is occurring.

Product security devices can be either disposable or reusable. Disposable devices may be affixed to a product permanently as a one-time-use device that is deactivated at the point of sale (POS), and the device leaves the retail store with the purchasing customer in a deactivated state that does not trigger, for example, the EAS system alarms. On the other hand, a reusable device may be removably locked to the product and can be unlocked and separated from the product at the POS, and therefore remains in the store for reuse on another product. In either case, if a security device does not pass through the POS to either be deactivated or removed, then the existence of an active device on the product can be detected by the EAS system antennas at the exits of the retail store and cause an alarm to sound.

The removal or deactivation of such security devices continues to be an issue with retail establishments. Retailers are continually working to improve customer experience, which includes minimizing or eliminating queuing and wait times at the POS. The time required to remove a reusable security device can add to the queue time leading to delays and a less desirable customer experience. Additionally, such security devices can pose issues for self-checkout POS systems, because special keys are often required to remove the reusable security devices from the product.

For example, many reusable security devices require application of a key, often a magnetic key, to remove the security device from the product at the POS without sounding an alarm. Application of the key can increase the time needed to, for example, remove the security device. Additionally, such security devices may require only a magnetic key for removal, which can create weaknesses in the security approach. For example, such magnetic keys may be fabricated or stolen thereby creating the risk that such keys can be used by thieves in an unmonitored or "dark" area of the store to remove the security devices from the products and then simply carry the products through the EAS systems at the exits without detection.

Disposable security devices often offer a superior experience, because removal of the device with a key is not required. Mere deactivation is needed, which may be accomplished wirelessly. However, disposable security devices, as one-time-use devices, can be costly, particularly if the devices include local, tamper alarming capabilities.

As such, there continues to be a need for improvement in the area of product security devices, particularly in the disposable security device space. In particular, streamlined and simplified functionality and application of the disposal security devices is needed to reduce cost and increase ease of use for retail store personnel.

BRIEF SUMMARY OF SOME EXAMPLES

According to some example embodiments, security device is provided. The security device may comprise a housing, an adhesive pad, a plunger switch, a protective backing, a sounder, a deactivator sensor, and processing circuitry. The housing may comprise a base plate, and the base plate may comprise an aperture. The adhesive pad may comprise a first pad surface and a second pad surface. The first pad surface and the second pad surface may comprise an adhesive. The first pad surface may be affixed to the base plate and the second pad surface may be configured for application to a retail product to secure the security device to the retail product. The plunger switch may comprise a plunger that is configured to be in a depressed position or in an extended position where the plunger extends through the aperture. The plunger switch may be configured to output a plunger switch signal in response to the plunger being in a depressed position or an extended position. The protective backing may be coupled to the second pad surface of the adhesive pad. The protective backing may be positioned to maintain the plunger in the depressed position. The protective backing may be removable to expose the second pad surface for application of the security device to the retail product. The sounder may be configured to controllably output an audible alarm sound, and the deactivator sensor may be configured to receive a deactivator signal. The processing circuitry may be coupled to the plunger switch, the deactivator sensor, and the sounder. The processing circuitry may be configured to control operation of the sounder based on a current state of the processing circuitry. According to some example embodiments, when the protective backing is maintaining the plunger in the depressed position, the processing circuitry may be in an inventory state. Further, in the inventory state, the processing circuitry is configured to take no action in response to the deactivator sensor detecting a deactivator signal.

According to some example embodiments, a method performed by the security device to transition from the inventory state is provided. The method may comprise monitoring, by the processing circuitry, the plunger switch signal to determine when the plunger moves into the extended position due to removal of the protective backing from the adhesive pad, and transitioning the processing circuitry into a ready to arm state in response to the plunger switch signal indicating that the plunger has moved into the extended position. In the ready to arm state, a subsequent movement of the plunger into the depressed position causes a transition into an armed state.

BRIEF DESCRIPTION OF THE SEVERAL VIEWS OF THE DRAWING(S)

Having thus described some example embodiments in general terms, reference will now be made to the accompanying drawings, which are not necessarily drawn to scale, and wherein:

DETAILED DESCRIPTION

Figure 1:
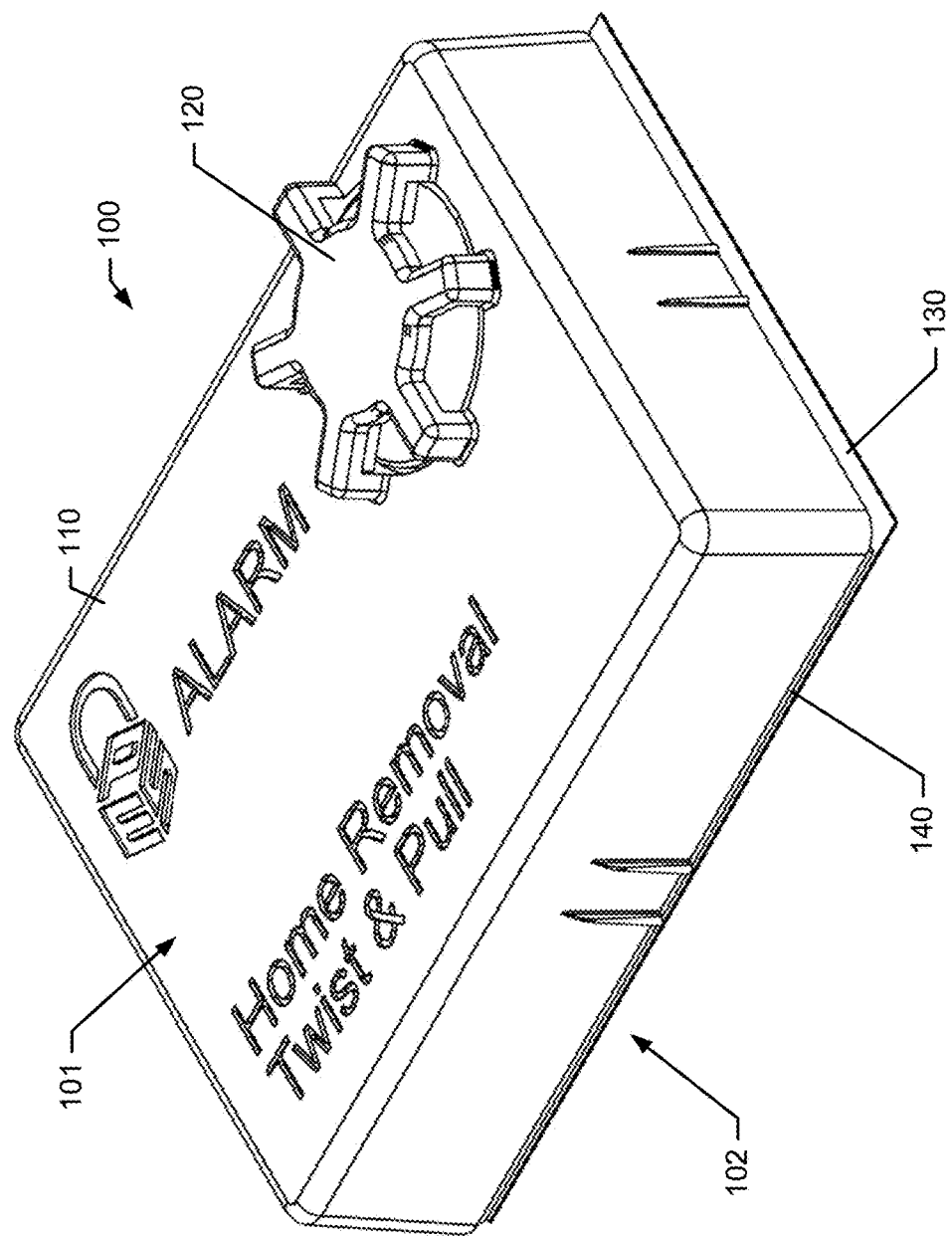
FIG. 1 is a perspective top view of an example security device with an adhesive pad and protective backing maintaining a plunger of a plunger switch in a depressed position according to some example embodiments.

Some example embodiments now will be described more fully hereinafter with reference to the accompanying drawings, in which some, but not all example embodiments are shown therein. Indeed, the examples described and pictured herein should not be construed as being limiting as to the scope, applicability, or configuration of the present disclosure. Rather, these embodiments are provided as example implementations so that this disclosure will satisfy applicable legal requirements. Like reference numerals refer to like elements throughout. As used herein, operable coupling should be understood to relate to direct or indirect connection that, in either case, enables functional interconnection of components that are operably coupled to each other.

According to some example embodiments, a disposable security device is described herein that can be affixed to a retail product to provide a security feature within a retail store environment. The security device may be, for example, a battery-powered device that includes local and remote alarming capabilities to inform store personnel that a theft event may be occurring. In this regard, if an armed disposable security device that is affixed to a product is removed and separated from the product, a local alarm on the device can be triggered to inform store personnel of a tamper event. Further, if the still-affixed and armed disposable security device passes through an EAS gate at the ingress or egress of the retail store, then an EAS element in the form of a resonator within the device may output a signal that causes the EAS system to sound an alarm indicating that a possible theft of the affixed product is occurring.

To deactivate the disposable security device in association with a purchase of the affixed product, a device in form of a deactivator (e.g., an EAS deactivator), often located at or near the POS, may be used. In this regard, the disposable security device may be configured to detect a deactivation field output by the deactivator and, in response to detecting the deactivator field, the disposable security device may be configured to transition into a disarmed state. In the disarmed state, the disposable security device's alarming features may be deactivated such that separation of the disposable security device from a product or the passage of the disposable security device through an EAS gate does not trigger a local or remote alarm. Accordingly, a purchasing customer may leave the store and simply remove and dispose of the security device without the security device alarming.

With regard to deactivation, according to some example embodiments, a security device with local alarming tamper detection features and EAS system alarming features may be disarmed at, for example, a POS via an associated deactivator. Such disarming via a deactivator may be performed as described in U.S. Patent Application Publication 2020/0043308, entitled ALARMING PRODUCT SECURITY DEVICE, which is incorporated by reference herein in its entirety.

An issue with alarming disposable security devices is the potential for unintentional arming of the devices during transit from manufacturing or during handling prior to application to a product. In this regard, an alarming disposable security device may be armed through application of the security device onto a product. According to some example embodiments, a plunger switch comprising a plunger that extends out of the housing of the security device may be used to detect when the security device is applied to a product to arm the security device for subsequent tamper or EAS system alarming. As such, care must be taken to avoid unintentionally arming the security device during shipping or handling prior to proper application to a product.

According to some example embodiments, disposable security devices described herein may include a removable protective backing or activation backing affixed to an adhesive pad that maintains a plunger of a plunger switch in a depressed position, e.g., during shipping from manufacturing and subsequent handling, until the security device is ready to be applied to a product. While the plunger of the security device is in this initial depressed state from manufacturing, the security device may remain dormant and unarmed in an inventory state. With the protective backing in place, the plunger is not at risk of being released and extended, which would transition the security device into a ready to arm state, and subsequently an armed state when the plunger is again depressed.

As such, example embodiments described herein address the issue of unintended arming of an alarming disposable security device until the user is ready to apply the device to a product. Additionally, by controlling the movement of the initial actuation of the plunger in this manner, the security device, according to some example embodiments, requires that only one mechanical input or actuating device is needed to utilize and implement the security device. No additional, separate arming button or trigger is needed to transition the security device from an inventory state to a ready to arm state and subsequently to an armed state. In other words, a single, two-position switch in the form of a plunger switch with an actuating plunger can be utilized to transition the security device through at least three or four functional states for the security device. According to some example embodiments, through the use of a single, two-state plunger switch, the security device maybe transitioned into four states comprising an inventory state, a ready to arm state, an armed state, and an alarm state. Use of the single, two-position switch to implement these various functional states can reduce the complexity of design and therefore the cost of the alarming disposable security device.

According to some example embodiments, the security device may include an adhesive pad that non-releasably adheres the security device to a product or the product packaging. As such, according to some example embodiments, the security device may be disposable, such that once the device is disarmed, it leaves the store with the purchased product, in a disarmed mode. In the disarmed mode, the security device will not sound either a local tamper alarm or a gate alarm system (e.g., an EAS system).

In this regard, the security device may be configured to be applied to a retail product to protect the retail product from theft. The security device may include tamper detection circuitry associated with a plunger switch and actuating plunger that extends from a base plate of the housing of the security device to engage with and be depressed or retracted by a product surface when applied to the product. If the plunger is extended, due to removal of the device from the product when the device is in an armed state, the device may cause a local alarm to be sounded in response to detection of the tamper event indicating that an unauthorized removal of the security device from the product is being attempted. In other words, according to some example embodiments, the tamper detection circuitry may include a plunger switch having a plunger positioned to actuate and trigger an audible tamper alarm, via associated processing circuitry, if the security device is pulled away from the product to which the security device is affixed while the security device is in the armed state.

According to some example embodiments, the tamper detection circuitry of the security device may be disarmed to allow authorized removal of the security product from the product by a purchasing customer or store personnel. As mentioned above, to disarm the tamper detection circuitry of the security device, the security device may be configured to detect an EAS deactivator and, more specifically, the electromagnetic fields generated by the deactivator. The deactivator may be a device that can be used to deactivate certain electronic article surveillance (EAS) tags (e.g., labels) by altering or destroying the resonant characteristics of the tags using the electromagnetic field of the deactivator so that the EAS tag no longer resonates when exposed to a field within a given frequency band.

In this regard, EAS tags, which may be a form of an EAS element, may be of two types, i.e., deactivatable and non-deactivatable. Deactivatable EAS tags may formed such that when a deactivatable EAS tag is subjected to an electromagnetic field having select characteristics (i.e., at a certain frequency and at certain power levels), the EAS tag may be deactivated. On the other hand, a non-deactivatable EAS tag may not be deactivated, and will continue to resonant, even after being exposed to an electromagnetic field that is attempting to deactivate that EAS tag. Accordingly, as referred to herein, a generic reference to an "EAS tag" may be referring to either a deactivatable or non-deactivatable EAS tag, unless the context deems otherwise.

In this regard, a POS may include such a deactivator that may be incorporated into, for example, a deactivator pad. Other types of deactivators may also be utilized such as ones that are integrated into a barcode scanning device or a deactivator wand. The deactivator may be configured to output an electromagnetic field at the resonant frequency of the EAS tag. In operation, the EAS deactivator may first undertake an interrogation process to determine that an EAS tag is within a deactivation zone (e.g., 2 or 3 inches) of the deactivator. The interrogation process may involve outputting an interrogation field to excite the EAS tag to provide a detectable return signal from the EAS tag. The interrogation field may be of a sufficient power level to excite the EAS tag without deactivating the EAS tag. Upon detecting that an EAS tag is present in the deactivation zone, the EAS deactivator may output a deactivation field to deactivate the EAS tag. The deactivation field may have certain characteristics (e.g., frequency and power level) to deactivate a deactivatable EAS tag. In this regard, some EAS deactivators may use multiple field pulses. The frequency of the field generated by each pulse may be different such that the pulses scan across of a range of frequencies. Additionally, the rate at which the pulses are output (e.g., the pulse rate) may be defined for a deactivator and the deactivator may be identified by sensing the pulse rate. Further, according to some example embodiments, for acousto-magnetic (AM) systems, the deactivation field may be a degaussing field that has a high magnetic component that decays over time to reduce or eliminate the magnetism of the AM EAS tag. Thus, upon detecting the presence of the EAS tag within the deactivator field at the POS due to receipt of a return signal from the EAS tag, the deactivator may be configured to output a different field to deactivate the EAS tags, and the characteristics of the deactivation field may be detectable by a security device to differentiate between a field generated by an EAS deactivator and a field generated by an EAS gate. The deactivator field may operate to deactivate the EAS tag, for example, by increasing a current in a radio frequency (RF) resonant circuit of an RF EAS tag to breakdown the dielectric between the plates of a capacitor and cause a short between the plates thereby preventing further resonating of the EAS tag. Alternatively, the deactivator field may operate to change the magnetism in a metal strip within an acousto-magnetic (AM) EAS tag thereby preventing the AM EAS tag from further resonating due to the change in magnetism.

However, according to some example embodiments, such a deactivator may also be leveraged to disarm the tamper detection circuitry of an example security device as described herein. In this regard, upon detecting the deactivation field generated by the deactivator, the security device may be configured to implement a process that, in some instances, may conclude with the tamper alarm being disarmed to permit removal of the security device from a product, without sounding an alarm. Additionally, the disarmed security device may be prevented from providing a response signal to an EAS system to inhibit the ability to sound the EAS system alarm. Further, according to some example embodiments, the tamper detection circuitry of the security device may remain disarmed until a user (e.g., store personnel) takes steps to re-arm the security device. To detect the deactivator field, the security device may employ a receiving device in the form of a field sensor capable of detecting an electromagnetic field of a deactivator. Such a field sensor may be an antenna that is implemented in the form of, for example, a deactivatable EAS tag, a non-deactivatable EAS tag, an inductor, a resonant circuit, a reed switch, or the like.

Additionally, an example security device may include an EAS tag (e.g., deactivatable or non-deactivatable) that is detectable by the deactivator and an EAS gate of an EAS system. An EAS gate is typically installed at the ingress and egress of a retail store. The EAS tag may be an RF tag (e.g., resonant at 8.2 or 4.8 MHz) or an AM tag (e.g., resonant at 58 kHz). The EAS tag may be configured to resonate and return a signal to, for example, an EAS gate when exposed to an electromagnetic field at the resonant frequency of the EAS tag. Upon detecting the EAS tag's return signal, the EAS gate may trigger a gate alarm to indicate that a possible theft may be occurring.

As such, according to some example embodiments, a security device is provided that leverages the functionality of a standard deactivator that is used to deactivate EAS tags to also disarm the tamper detection circuitry of the security device. By employing such a security device, the deactivator may therefore offer dual functionality to assist in the implementation of security devices in a retail environment, in accordance with some example embodiments. Further, by requiring the detection of the deactivator field prior to disarming the tamper detection circuitry, a security device, according to some example embodiments, may provide an added level of security relative to a device that merely requires, for example, a specialized magnetic key to unlock the device.

Figure 2:
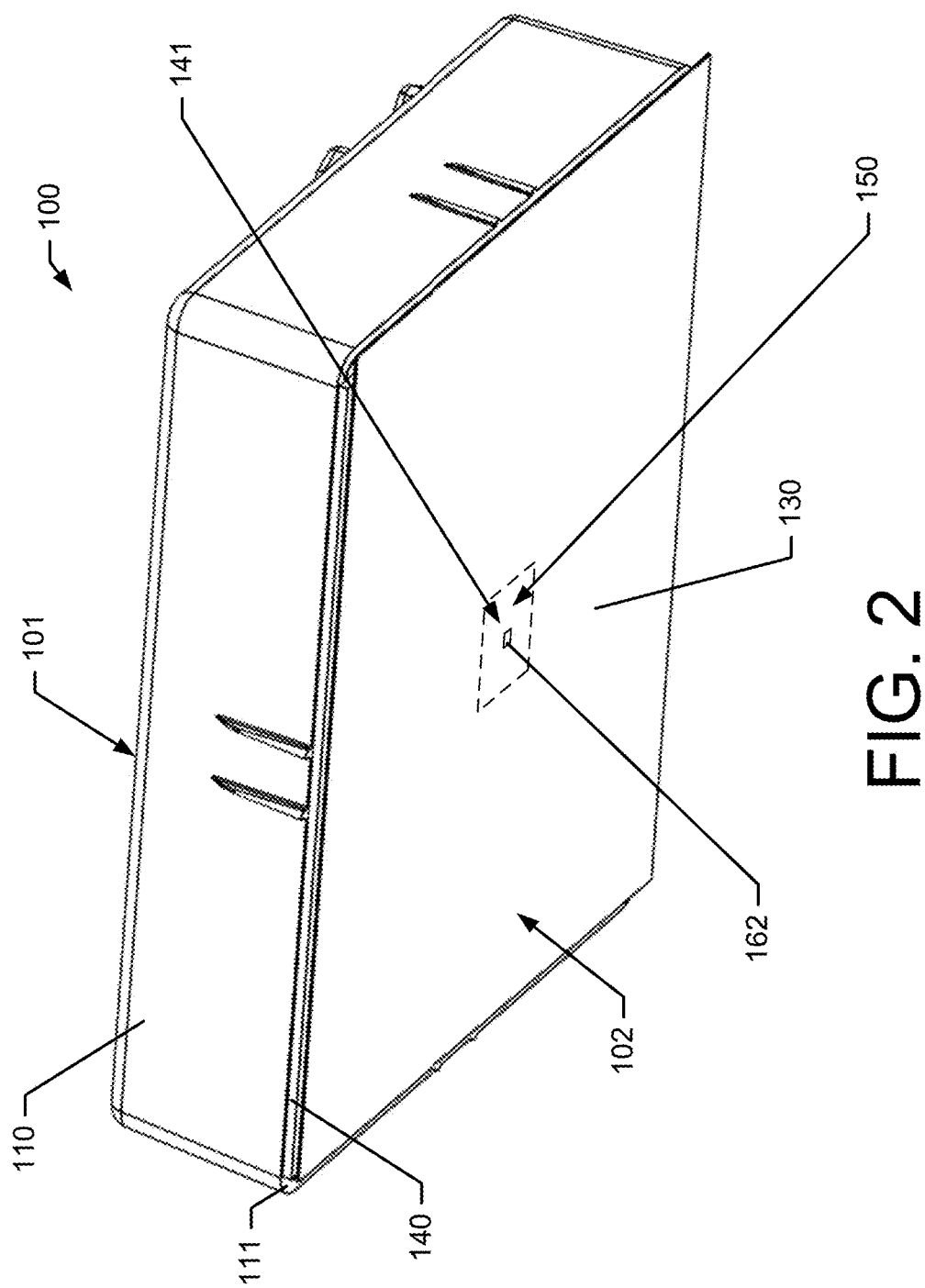
FIG. 2 is a perspective bottom view of the example security device with an adhesive pad and protective backing maintaining a plunger of a plunger switch in a depressed position according to some example embodiments.
Figure 5:
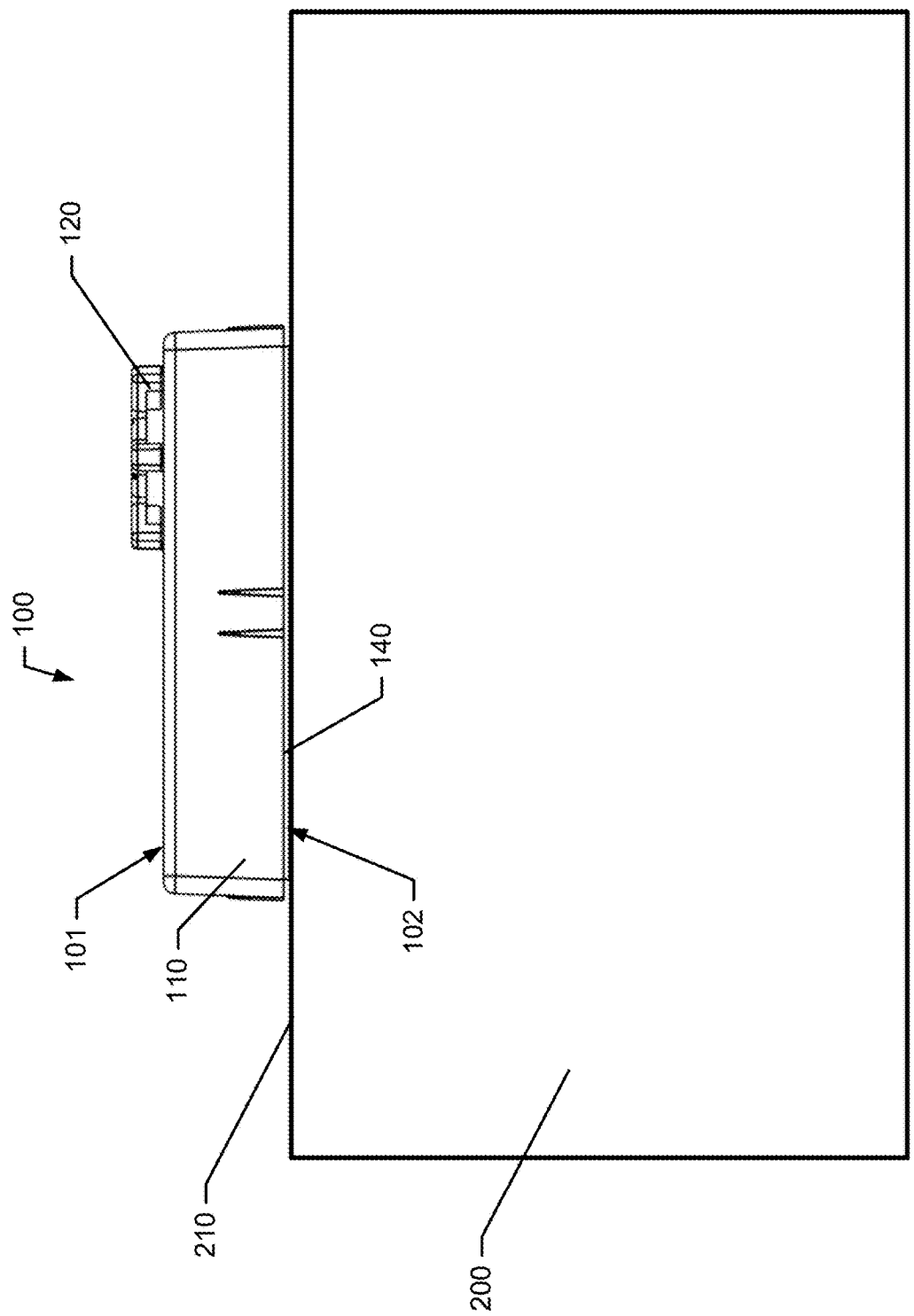
FIG. 5 is a side view of the example security device with an adhesive pad applied to a product and the plunger depressed due to interaction with a product surface according to some example embodiments.

FIGS. 1 and 2 provide a perspective top view and a perspective bottom view, respectively, of an example security device 100 with an adhesive pad 140 and protective backing 130 that maintains a plunger in a depressed position according to some example embodiments. The security device 100 may comprise a housing 110, which may comprise a cover and a base plate 111. The housing 110 may hold or house circuitry including tamper detection circuitry that may be secured therein. The housing 110 may include a sound vent 120, which may be aligned with a sounder device disposed within the housing 110 that facilitates throughput of high-volume/decibel sound for use during alarming. According to some example embodiments, the sound vent 120 and the sounder may be positioned to emit alarm sound from a top side 101 of security device 100. Since the top side 101 is exposed when the security device 100 is affixed to a product (as shown in FIG. 5), positioning the sounder and sound vent 120 in this manner operates to maximize the volume output of the sounder.

Additionally, as shown in FIG. 2, the security device 100 may include an adhesive pad 140 coupled to the base plate 111 on the bottom side 102 of the housing 110. The bottom side 102 may be the surface that is positioned adjacent to the product when the security device 100 is applied. Further, the adhesive pad 140 may be covered by a removable protective backing 130 (or liner) on the side opposite the security device housing 110 that operates to both protect the adhesive surface of the pad 140 until a user is ready to apply the security device 100 to a product and maintain a plunger 162 in a depressed position until a user removes the protective backing 130 in preparation for application of the security device 100 to a product surface.

The adhesive pad 140 may be a sheet or the adhesive pad 140 may be comprised of a number of separate component pad members. According to some example embodiments, one side of the adhesive pad 140 may be applied to the base plate 111 of the housing 110 at manufacturing of the security device 100 and the opposite side of the adhesive pad 140 may be coupled to the protective backing 130. According to some example embodiments, the adhesive pad 140 may comprise a foam substrate and a pressure-sensitive adhesive (PSA) on both sides. A PSA may be a non-reactive adhesive that forms a bond when pressure is applied. As such, according to some example embodiments, the degree of bond that is formed through use of the PSA may be based on an amount of pressure that is applied to the adhesive pad 140. In some example embodiments, the adhesive pad 140 may be a Remo One PSA pad made from Duraco Remo One tape, for example, having a thickness of 1/32 inch.

As mentioned above, a bottom side of the adhesive pad 140 may be covered by a removable protective backing 130. The protective backing 130 may be included on the adhesive pad 140 at manufacturing and, as such, the protective backing 130 may be in place on the bottom side of the adhesive pad 140 during shipping of the manufactured security device 100.

Figure 3:
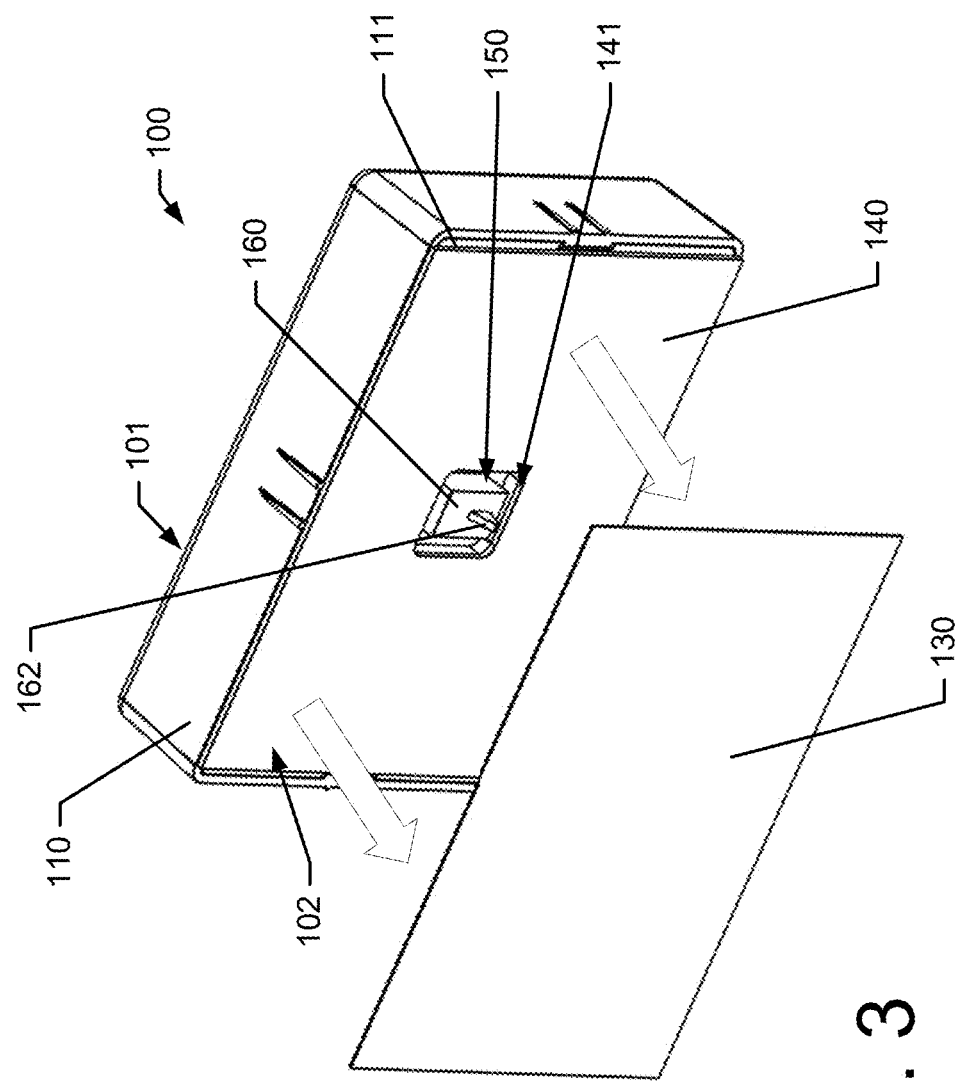
FIG. 3 illustrates removal of the protective backing from the adhesive pad of the security device to permit the plunger to actuate into an extended position according to some example embodiments.

As shown in FIGS. 2 and 3, the base plate 111 of the security device 100's housing 110 may include an aperture 150 through which a plunger 162 of a plunger switch 160 may extend. Further, the adhesive pad 140 may include a window 141 through which the plunger 162 of a plunger switch 160 may extend. In FIG. 2, the security device 100 is shown with the protective backing 130 still affixed to the adhesive pad 140, and therefore plunger 162, which may be spring biased into the extended position, is in a depressed position because the plunger 162 is resting against the protective backing 130. The dotted lines indicating the outline of the aperture 150, the window 141, and the plunger 162 are shown in FIG. 2 since the aperture 150 and the plunger 162 are disposed behind the protective backing 130 in FIG. 2. As further described below, the security device 100 is shown in the inventory state in FIG. 2, since the protective backing 130 is still applied to the adhesive pad 140.

Figure 4:
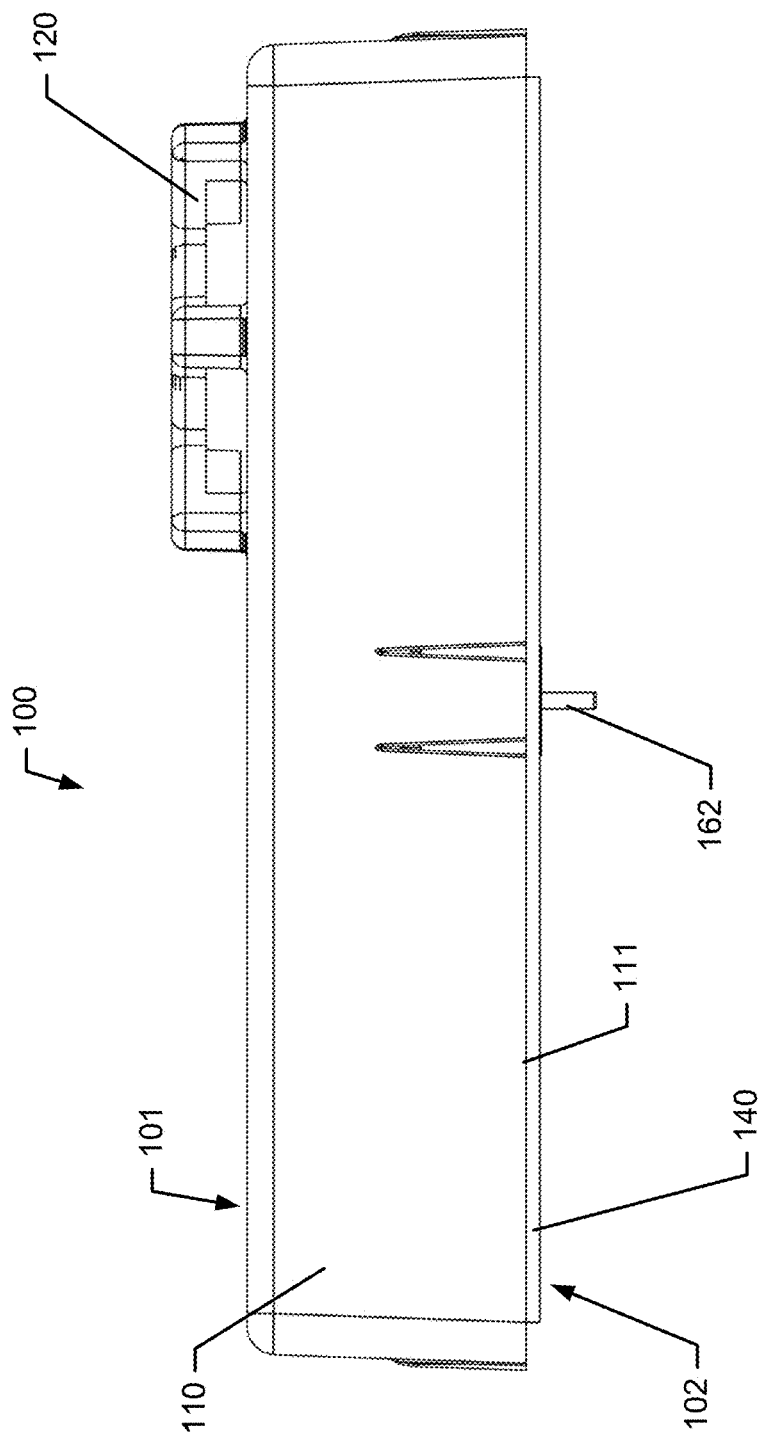
FIG. 4 is a side view of the example security device with an adhesive pad removed and the plunger extended according to some example embodiments.

With reference to FIG. 3, the protective backing 130 has been removed from the adhesive pad 140 to expose the adhesive surface of the adhesive pad 140 and permit movement of the plunger 162. As such, the spring-biased plunger 162 is no longer maintained in the depressed position by the protective backing 130 and the plunger 162 is permitted to move into the extended position. In the extended position, the plunger 162 extends through and beyond the aperture 150 and the window 141 and their associated planes, as shown in FIG. 4. According to some example embodiments, the bottom side of the adhesive pad 140 may be disposed in a plane and the plunger 162 may extend through and beyond the plane of the adhesive pad 140 to permit engagement with a product surface.

With the protective backing 130 removed, as shown in FIG. 3, the aperture 150 in the base plate 111 of the security device 100 housing 110 is visible, and the window 141 in the adhesive pad 140 is visible. Additionally, the plunger switch 160 is also visible through the aperture 150. With the protective backing 130 removed and the plunger 162 extended as shown in FIGS. 3 and 4, and since the security device 100 is not yet affixed to a product, the security device 100 as shown in FIGS. 3 and 4 is in a ready to arm state as further described below.

Additionally, as best seen in FIG. 3, the adhesive pad 140 is formed of a sheet with a window 141 disposed therein to permit passage of the plunger 162 through the window 141. When coupled to the base plate 111 of the security device 100, the window 141 aligns with an aperture 150 in the base plate 111. To maximize adherence to a product surface, the adhesive pad 140 may cover, for example, substantially all of the surface of the base plate 111 of the hosing 110 of the security device 100, with the exception of the area of the window 141. As such, the adhesive pad 140 may have a surface area of one side that is substantially the same as the base plate 111 of the housing 110 with the exception of the window 141 area. The protective backing 130 may, according to some example embodiments, have the same perimeter shape as the adhesive pad 140. However, the protective backing 130 may be a continuous sheet that, according to some example embodiments, does not include an opening that aligns with the plunger 162. As such, the protective backing 130 may include material that overlaps the window 141 and the aperture 150 and directly engages with the plunger 162. Further, a surface area of one side of the protective backing 130 is larger than a surface area of one side of the adhesive pad 140 in an amount that is the size of the window 141.

Referring now to FIG. 5, the security device 100 is shown as being affixed to the product packaging 200. As such, subsequent to removing the protective backing 130, the security device 100 has been pressed onto the product surface 210 to permit the adhesive pad 140 to adhere to the product surface 210. During application of the security device 100 onto the product surface 210, the plunger 162 was depressed back into the housing 110. Accordingly, the product surface 210 is now maintaining the plunger 162 in the depressed position. As further described below, with the plunger 162 being held in the depressed position by the product surface 210, the security device 100 may be in an armed state in FIG. 5. Alternatively, if the security device 100 has been exposed to a field of a deactivator, the security device 100 may be in a disarmed state in FIG. 5.

Figure 6A:
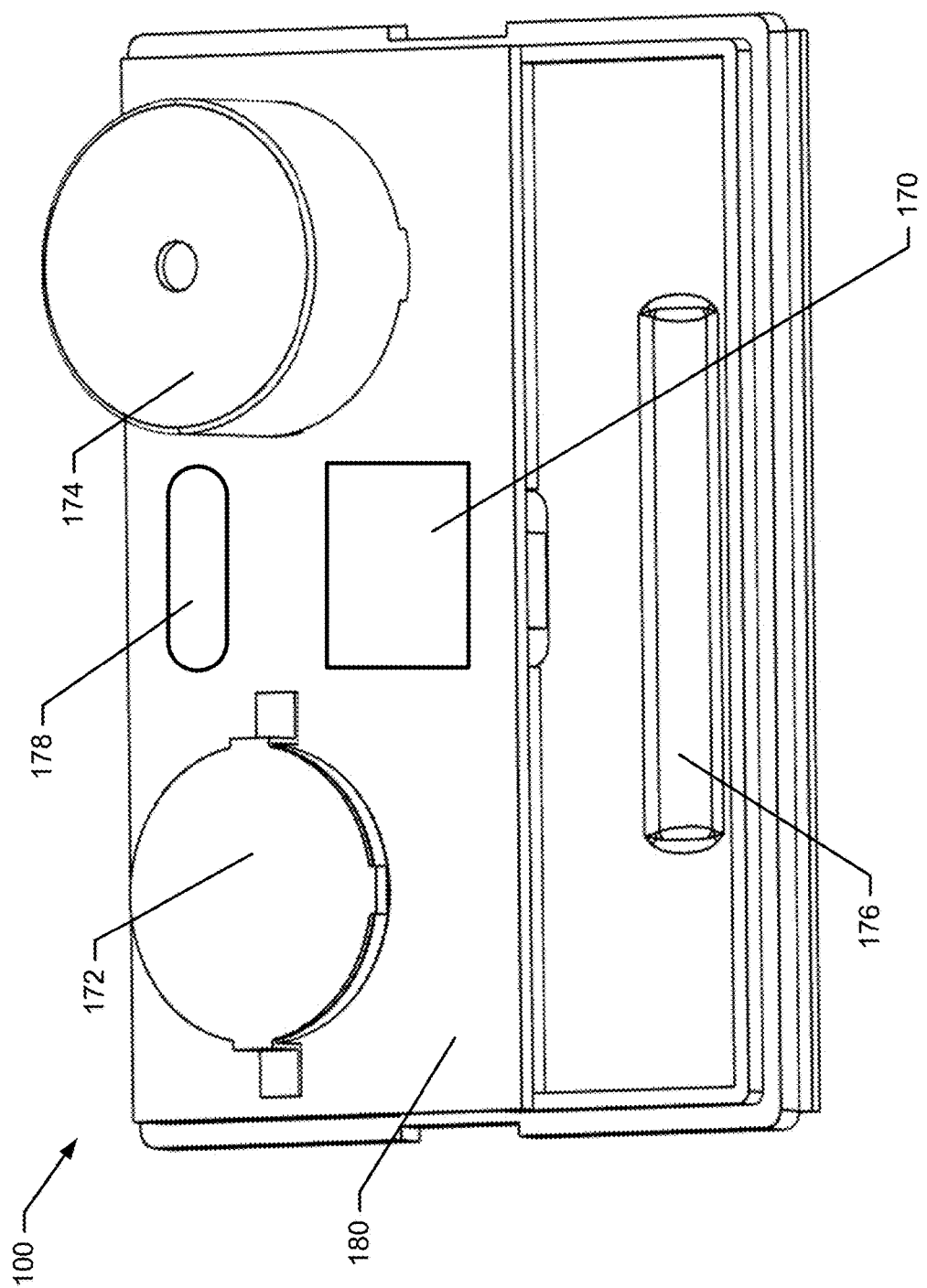
FIG. 6A is a perspective top view of an example security device with a housing cover removed revealing internal components according to some example embodiments.

Referring now to FIG. 6A, a perspective top view of an example security device is provided with the cover of the housing 110 removed revealing internal components according to some example embodiments. In this regard, the circuit board 180 may include processing circuitry 170, a battery 172, a sounder 174, an EAS element 176, and deactivator sensor 178 are shown. Further, electrical components may be disposed on the opposite, out-of-view side of the circuit board 180.

Figure 6B:
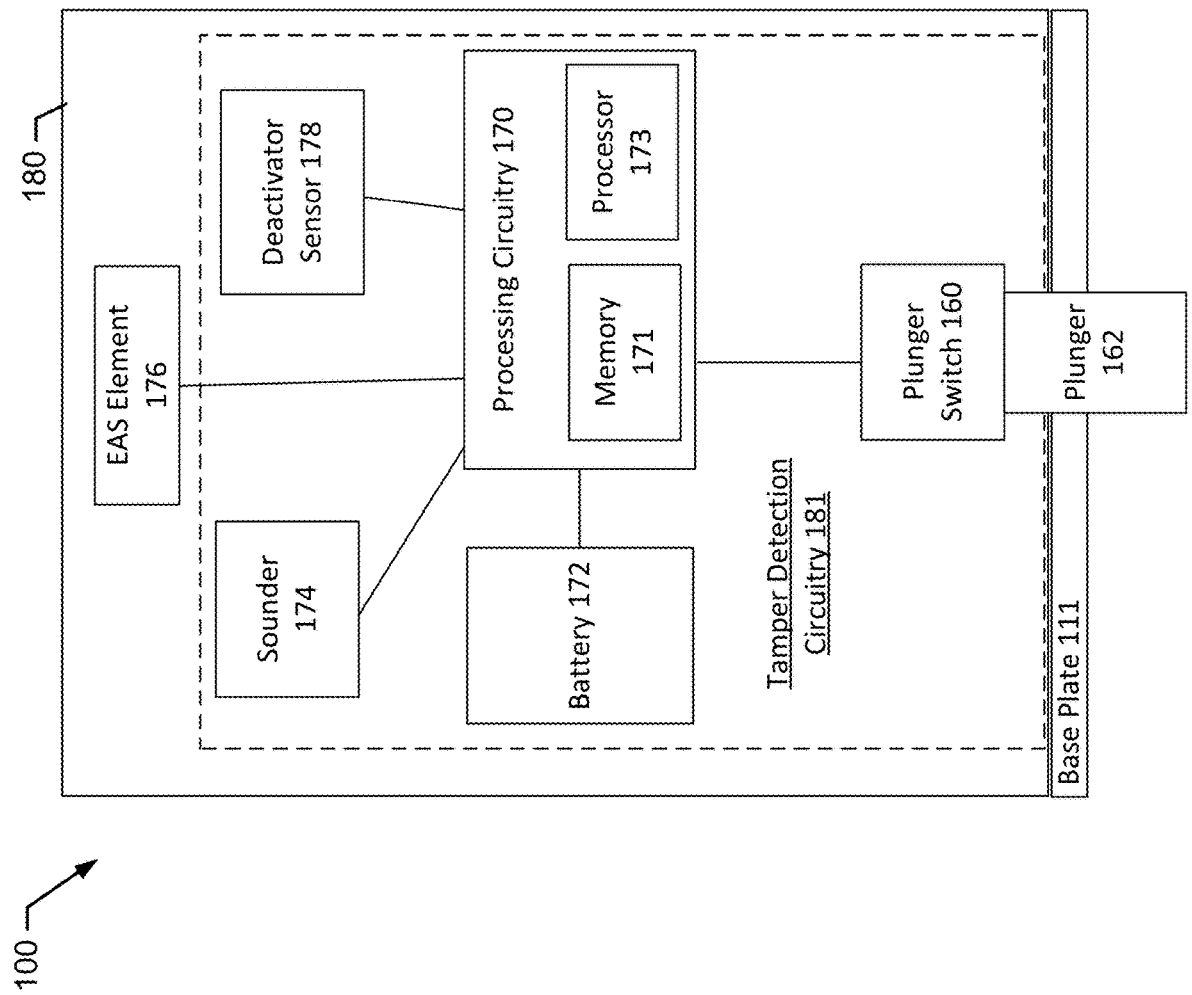
FIG. 6B is a block diagram illustrating components of an example security device according to some example embodiments.

Following from FIG. 6A, FIG. 6B is a block diagram of the functional components of the security device 100. The circuit board 180 may provide structural support and electrical connections between the various circuitry components of the security device 100. In this regard, tamper detection circuitry 181 may be included. The tamper detection circuitry 181 may comprise processing circuitry 170, a battery 172, a sounder 174, a deactivator sensor 178, and a plunger switch 160. An EAS element 176 may also be included. The processing circuitry 170 may comprise a memory 171 and a processor 173, and the plunger switch 160 may comprise a plunger 162.

The battery 172 may be a power source that operates to provide electrical power to the various electrical components of the security device 100, including the processing circuitry 170 as described below. The sounder 174 may be any type of device that may be driven to produce an audible sound for an alarm. In this regard, the sounder 174 may be embodied as a speaker, piezoelectric sounder, or the like. The sounder 174 may be driven by the processing circuitry 170 to cause an alarm to sound when triggered by the processing circuitry 170.

The plunger switch 160 may operate with the plunger 162 to form a tamper sensor that can detect when the security device 100 is being pulled away from the item to which the security device 100 is affixed. In this regard, the plunger switch 160 may be operably coupled to the plunger 162 such that when the plunger 162 moves between a depressed position and an extended position, the plunger switch transitions from a first switch state (e.g., closed) to a second switch state (e.g., open) and provides associated plunger switch signal to the processing circuitry 170 indicative of the position of the plunger 162. Actuation of the plunger 162 may cause the plunger switch 160 to generate a plunger switch signal to be detected by the processing circuitry 170. According to some example embodiments, the plunger 162 may be biased towards an extended position (e.g., extending downward) by, for example, a spring.

The EAS element 176 may be disposed within the internal housing cavity of the security device 100 and may be configured to operate, for example, as an EAS tag. The EAS element 176 may be an RF tag (e.g., an RF label) or an AM tag (e.g., an AM chicklet). According to some example embodiments, the EAS element 176 may comprise a ferrite rod and a wire coil. In some example embodiments, as shown in FIG. 6A, the EAS element 176 may be disposed separate from the circuit board 180 in the internal cavity of the security device 100. However, according to some example embodiments, the EAS element 176 may be disposed on the circuit board 180. The EAS element 176 may be configured to resonate in the presence of an appropriate field to thereby send a return wireless signal for detection by an EAS gate or a deactivator as described herein.

The deactivator sensor 178 may be electrically connected to the processing circuitry 170. The deactivator sensor 178 may be configured to detect an electromagnetic field, for example, generated by an EAS deactivator. In this regard, the deactivator sensor 178 may be an antenna that is implemented in the form of an inductor, a resonant circuit, a reed switch, or the like. In this regard, the deactivator sensor 178 may have an output in the form of a deactivation signal that is provided to the processing circuitry 170 for evaluation. According to some example embodiments, the EAS element 176 may operate as the deactivator sensor 178, and a separate deactivator sensor 178 need not be included. The processing circuitry 170 may be connected to the EAS element 176 and the processing circuitry 170 may be configured to detect resonant current in the EAS element 176 due to the presence of an EAS gate or deactivator field. According to some example embodiments, the deactivator sensor 178 may be configured to detect a field generated by an EAS tag, such as EAS element 176. In this regard, for example, an AM deactivatable EAS tag may generate a magnetic field due to its magnetism. As such, the deactivator sensor 178 may be configured to detect the absence of a field being generated by the AM deactivatable EAS tag after a deactivation, which may be used to trigger a deactivation of the tamper detection circuitry 181. According to some example embodiments, as described herein, a deactivation sensor, such as the deactivator sensor 178, may be configured to detect a deactivation field provided by an EAS deactivator. Additionally, the deactivator sensor 178 and the EAS element 176, as separate components, may be housed within the housing of the security device 100.

According to some example embodiments, to detect a deactivator signal from an EAS deactivator, the processing circuitry 170 of the security device 100 may be configured to detect characteristics of the deactivation field. These characteristics may be different from those of a field, for example, generated by an EAS gate at an exit of a retail store, and therefore the processing circuitry 170 may be configured to differentiate between a deactivation field and a gate field. Therefore, the processing circuitry 170 may be able to trigger functionality based on the detection of a deactivation field, such as disarming the tamper detection circuitry 181 and the security device 100. According to some example embodiments, the processing circuitry 170 may be configured to leverage the deactivator sensor 178 to detect relatively high power pulses, at a given rate and at one or more given frequencies that would indicate the presence of an EAS deactivator attempting to deactivate, for example, an RF EAS tag. Alternatively, the tamper detection circuitry 181 may be configured to leverage the deactivator sensor 178 to detect a deactivation field in the form of a degaussing field that oscillates at a given frequency (e.g., 800 Hz) and then decays in power over time (e.g., 25% decay rate), which would indicate the presence of an EAS deactivator attempting to deactivate, for example, an AM EAS tag. Further, according to some example embodiments, the deactivator sensor 178 may be configured and positioned within the security device 100 to detect changes in the deactivator field caused by presence of the EAS element 176 to determine the presence of an EAS deactivator. Further, the deactivator sensor 178 may be configured to detect a field generated by magnetism of the EAS element 176 embodied as a deactivatable AM EAS tag housed within the security device 100. In this regard, when such a deactivatable AM EAS tag is subjected to a deactivation field, the deactivatable AM EAS tag may become demagnetized. As such, the deactivator sensor 178 may no longer detect the field of the deactivatable AM EAS tag, which is indicative of the presence of an EAS deactivator.

The processing circuitry 170 may comprise a memory 171 and a processor 173. In this regard, the processor 173 may be any type of processing device that is either hardware configured to perform defined functionalities (e.g., an field programmable gate array (FPGA) or an application specific integrated circuit (ASIC)) or the processor 173 may be configured via execution of instructions (e.g., compiled software or firmware instructions), possibly stored in the memory 171. The tamper detection circuitry 181 and, more specifically the processing circuitry 170, may be configured to perform various functionalities including those described in association with the flowchart of FIG. 7. In this regard, FIG. 7 provides a method that may be performed by the security device 100.

Figure 7:
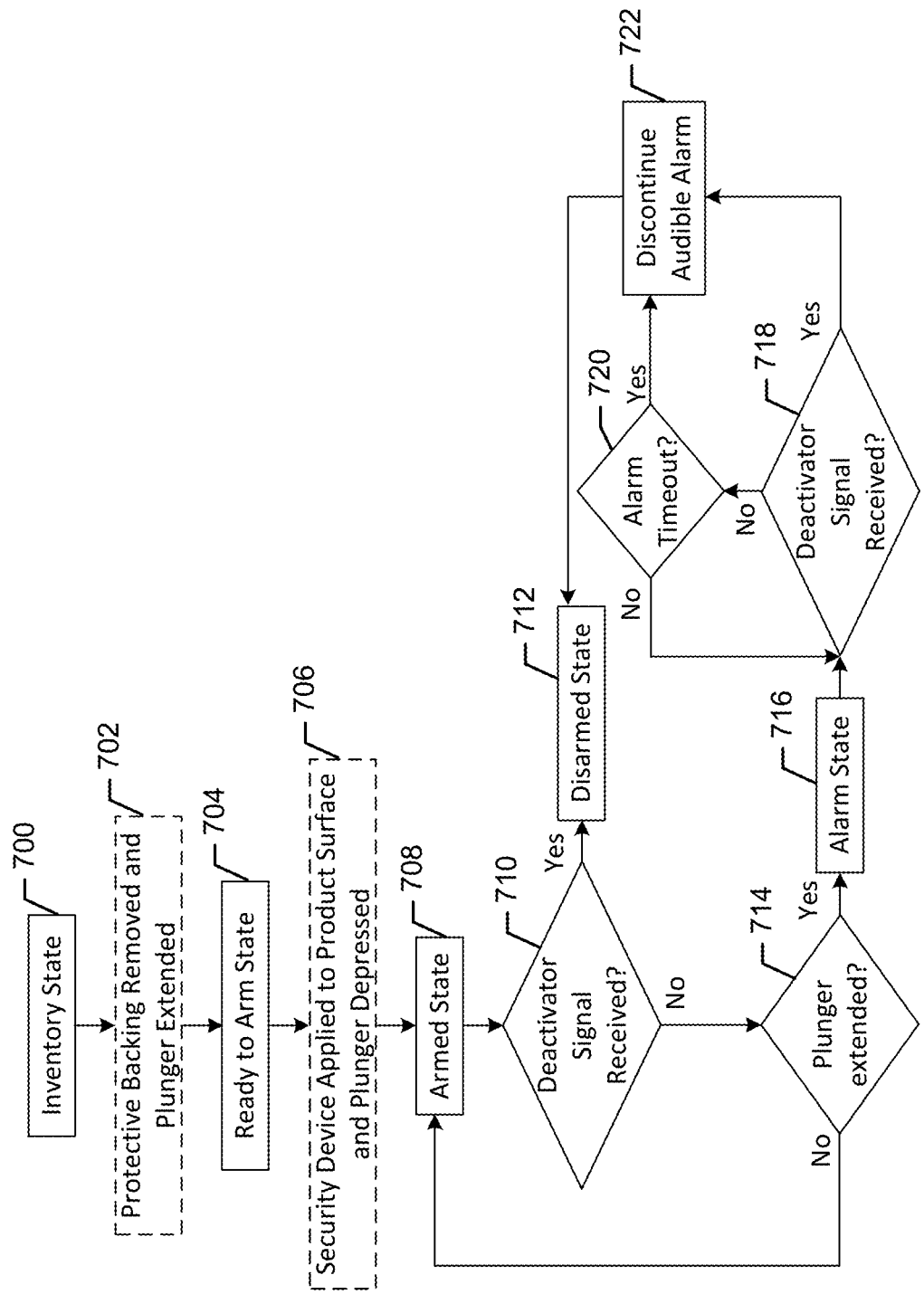
FIG. 7 is an example operational flowchart of a method comprising the functional states of an example security device according to some example embodiments.

With reference to FIG. 7, at 700, the tamper detection circuitry 181, and more specifically, the processing circuitry 170, may be in an inventory state. The processing circuitry 170 and the security device 100 may be placed in the inventory state at manufacture time. The inventory state is useful prior to application of the security device 100 to a product. For example, the security device 100 may be in the inventory state during shipping and storage prior to use. In the inventory state, the protective backing 130 is disposed on the adhesive pad 140 such that the plunger 162 is maintained in a depressed position. With the plunger 162 in the depressed position, the plunger switch 160 may be in a first state to provide a signal to the processing circuitry 170 indicating that the plunger 162 is in the depressed position. The processing circuitry 170 may maintain the security device 100 in the inventory state until the plunger 162 moves into an extended position.

While in the inventory state, the processing circuitry 170 may be configured to ignore or otherwise not act upon receipt of a deactivator signal. In this regard, the processing circuitry 170 may be configured to detune the EAS element 176 or the deactivator sensor 178 to prevent receipt of the deactivator signal from a deactivator or a gate signal from an EAS gate. Alternatively, the processing circuitry 170 may be configured to discard any detection of a deactivator signal or detection of EAS gate signal while in the inventory state. Further, according to some example embodiments, the processing circuitry 170 may discontinue polling or other monitoring the EAS element 176 or the deactivator sensor 178 in the inventory state. According to some example embodiments, while in the inventory state the processing circuitry 170 may be configured to monitor the signal from the plunger switch 160 to determine that the plunger 162 has remained in the depressed position (i.e., the protective backing 130 is still affixed to the adhesive pad 140).

At 702, a user may remove the protective backing 130 from the adhesive pad 140 and the security device 100, thereby allowing the plunger 162 to move into the extended position. The processing circuitry 170 may be configured monitor the signal from the plunger switch 160 and determine that the plunger switch 160 has transitioned into a second state in response to the plunger 162 moving into the extended position. Upon detection of the plunger 162 moving into the extended position, the processing circuitry 170 may transition from the inventory state into the ready to arm state at 704.

While in the ready to arm state, the processing circuitry 170 may be configured to ignore or otherwise not act upon receipt of a deactivator signal. In this regard, the processing circuitry 170 may be configured to detune the EAS element 176 to prevent receipt of the deactivator signal from a deactivator. Alternatively, the processing circuitry 170 may be configured to discard any detection of a deactivator signal or detection of EAS gate signal while in the inventory state. Further, according to some example embodiments, the processing circuitry 170 may discontinue polling or other monitoring the EAS element 176 or the deactivator sensor 178 in the inventory state. According to some example embodiments, while in the ready to arm state the processing circuitry 170 may be configured to monitor the signal from the plunger switch 160 to determine that the plunger 162 has remained in the extended position (i.e., the security device 100 has not yet been applied to product, which would cause the plunger 162 to move back into the depressed position).

At 706, a user may apply and affix the security device 100 to a product surface by contacting the exposed surface of the adhesive pad 140 to the product surface. In this process, the plunger 162 will contact the product surface thereby causing the plunger 162 to move into the depressed position. The processing circuitry 170 may be configured monitor the signal from the plunger switch 160 and determine that the plunger switch 160 has transitioned back into the first state in response to the plunger 162 moving into the depressed position. Upon detection of the plunger 162 moving into the depressed position while the processing circuitry 170 and the security device 100 are in the ready to arm state, the processing circuitry 170 may transition from the ready to arm state into the armed state at 708.

While in the armed state, the processing circuitry 170 may be configured to monitor for and act upon receipt of a deactivator signal, which may comprise detection of the deactivator field. In this regard, the processing circuitry 170 may be configured to tune the EAS element 176 to a frequency that ensures receipt of the deactivator signal from a deactivator. Additionally, in the armed state, the EAS element 176 may be permitted to output a resonator signal in response to a deactivator signal or an EAS gate signal. For the EAS gat signal, the responsive resonator signal may trigger an EAS gate alarm as described herein.

With respect to the deactivator signal, a check or polling for receipt of the deactivator signal, via the deactivator sensor 178 may be performed 710. If the processing circuitry 170 determines that the deactivator signal is received, then the security device 100 and the processing circuitry 170 may transition from the armed state to the disarmed state at 712.

The disarmed state, the processing circuitry 170 and the security device 100 may operate similar to the inventory state with the exception that actuation of the plunger 162 does not trigger a transition to another state. As such, in the disarmed state, the processing circuitry 170 may be configured to ignore or otherwise not act upon receipt of a deactivator signal or an EAS gate signal. In this regard, the processing circuitry 170 may be configured to detune the EAS element 176 to prevent receipt of the deactivator signal from a deactivator. Alternatively, the processing circuitry 170 may be configured to discard any detection of a deactivator signal or detection of EAS gate signal while in the disarmed state. Further, according to some example embodiments, the processing circuitry 170 may discontinue polling or other monitoring the EAS element 176 or the deactivator sensor 178 in the disarmed state. According to some example embodiments, while in the disarmed state the processing circuitry 170 may also discontinue monitoring for a signal from the plunger switch 160, since the disarmed state is an end state that does not depend on the signal provided by the plunger switch 160.

Accordingly, in the disarmed state the disposable security device 100 may be completely deactivated, and, for example, power from the battery 172 to other components may be interrupted to power down the security device 100. It is assumed that the transition to the disarmed state was associated with the purchase of the product to which the security device 100 is affixed. As such, the risk of theft no longer exists. Therefore, the security device 100 may be separated from the product without sounding an alarm, or the security device 100 may leave the store through the EAS gates without sounding an alarm.

Returning back to the condition where the security device 100 and the processing circuitry 170 are in the armed state at 708, a condition can occur where no deactivator signal is received and therefore a check or polling of the signal provided by the plunger switch 160 may be performed at 714. If the plunger 162 remains depressed (i.e., the security device 100 remains secured to the product), the security device 100 and the processing circuitry 170 remain in the armed state at 708, and the checks at 710 and 714 continue.

However, if the check or polling of the signal provided by the plunger switch 160 performed at 714 determines that the plunger 162 has transitioned to an extended position as indicated by a state of the signal from the plunger switch 160, the security device 100 and the processing circuitry 170 may transition into an alarm state at 716 due to detection of a tamper event.

In the alarm state, the processing circuitry 170 is configured to control the sounder 174 to output an audible alarm indicating that a possible theft is occurring since the security device 100 has been separated from the product in a transition from the armed state. Additionally, in the alarm state, the processing circuitry 170 may be configured to monitor for and act upon receipt of a deactivator signal, which may comprise detection of the deactivator field in same manner as provided in the armed state. Additionally, in the alarm state, the EAS element 176 may be permitted to output a resonator signal in response to a deactivator signal or an EAS gate signal. For the EAS gate signal, the responsive resonator signal may trigger an EAS gate alarm as described herein.

As indicated above, while in the alarm state, the processing circuitry 170 may still check or poll for receipt of the deactivator signal at 718. If the deactivator signal is received, then the processing circuitry 170 may control the sounder 174 to discontinue outputting the audible alarm at 722 and transition into the disarmed state at 712. Additionally, a timer may be implemented that is initiated by the processing circuitry 170 when entering the alarm state. Checks for the deactivator signal may continue at 718 and checks for an alarm timeout condition may be performed at 720. If a an alarm timeout condition arises at 720 (e.g., due to the timer reaching a threshold alarm time, such as, for example, three minutes, five minutes, or the like), then then the processing circuitry 170 may control the sounder 174 to discontinue outputting the audible alarm at 722 and transition into the disarmed state at 712. If the alarm timeout condition does not arise at 720, then checks for the deactivator signal at 718 and checks for the alarm timeout condition at 720 may continue until the alarm timeout condition arises.

In view of the foregoing description, example embodiments of a security device and associated methods are provided. The example security device may comprise a housing, an adhesive pad, a plunger switch, a protective backing, a sounder, a deactivator sensor, and processing circuitry. The housing may comprise a base plate, and the base plate may comprise an aperture. The adhesive pad may comprise a first pad surface and a second pad surface. The first pad surface and the second pad surface may comprise an adhesive. The first pad surface may be affixed to the base plate and the second pad surface may be configured for application to a retail product to secure the security device to the retail product. The plunger switch may comprise a plunger that is configured to be in a depressed position or in an extended position where the plunger extends through the aperture. The plunger switch may be configured to output a plunger switch signal in response to the plunger being in a depressed position or an extended position. The protective backing may be coupled to the second pad surface of the adhesive pad. The protective backing may be positioned to maintain the plunger in the depressed position. The protective backing may be removable to expose the second pad surface for application of the security device to the retail product. The sounder may be configured to controllably output an audible alarm sound, and the deactivator sensor may be configured to receive a deactivator signal. The processing circuitry may be coupled to the plunger switch, the deactivator sensor, and the sounder. The processing circuitry may be configured to control operation of the sounder based on a current state of the processing circuitry. According to some example embodiments, when the protective backing is maintaining the plunger in the depressed position, the processing circuitry may be in an inventory state. Further, in the inventory state, the processing circuitry is configured to take no action in response to the deactivator sensor detecting a deactivator signal.

According to some example embodiments, a method performed by the security device to transition from the inventory state is provided. The method may comprise monitoring, by the processing circuitry, the plunger switch signal to determine when the plunger moves into the extended position due to removal of the protective backing from the adhesive pad, and transitioning the processing circuitry into a ready to arm state in response to the plunger switch signal indicating that the plunger has moved into the extended position. In the ready to arm state, a subsequent movement of the plunger into the depressed position causes a transition into an armed state.

Further, according to some example embodiments, the adhesive pad may be formed of a sheet with a window disposed therein to permit passage of the plunger through the window when the plunger is in the extended position. Additionally, according to some example embodiments, the window in the adhesive pad may align with the aperture in the base plate. Additionally, according to some example embodiments, the protective backing may overlap the window in the adhesive pad and the aperture in the base plate to maintain the plunger in the depressed position. Additionally or alternatively, the plunger may be spring-biased to be in the extended position.

Additionally or alternatively, the plunger switch may be the only mechanical actuating input to the processing circuitry. Further, movement of the plunger from the depressed position to the extended position in response to removal of the protective backing may be the only action that causes and is required to cause the processing circuitry to transition from the inventory state to a ready to arm state. In the ready to arm state, a subsequent movement of the plunger into a depressed position may transition the processing circuitry into an armed state where the processing circuitry is configured to control the sounder to output an audible alarm in response to the plunger returning to the extended position.

Additionally or alternatively, the processing circuitry may be configured to monitor the plunger switch signal to determine when the plunger moves into the extended position due to removal of the protective backing from the adhesive pad, and transition into a ready to arm state in response to the plunger switch signal indicating that the plunger has moved into the extended position. Additionally, the processing circuitry may be further configured to transition from the ready to arm state to an armed state in response to the plunger switch signal indicating that the plunger has moved into the depressed position. In the armed state, the processing circuitry may be configured to control the sounder to output an audible alarm in response to plunger switch signal indicating that the plunger has returned to the extended position.

With respect to an example method, the method may comprise monitoring, by the processing circuitry, the plunger switch signal to determine when the plunger moves into the extended position due to removal of the protective backing from the adhesive pad, and transitioning the processing circuitry into a ready to arm state in response to the plunger switch signal indicating that the plunger has moved into the extended position. In this regard, in the ready to arm state, a subsequent movement of the plunger into the depressed position causes a transition into an armed state. Further, the method may comprise transitioning from the ready to arm state to the armed state in response to the plunger switch signal indicating that the plunger has moved into the depressed position. In this regard, in the armed state, the processing circuitry may be configured to control the sounder to output an audible alarm in response to plunger switch signal indicating that the plunger has returned to the extended position. Also, according to some example embodiments, the method may comprise transitioning from the armed state to an alarm state in response to the plunger switch signal indicating that the plunger has subsequently moved into the extended position. In the alarm state, the processing circuitry may control the sounder to output the audible alarm and the processing circuitry may monitor the deactivator sensor for receipt of a deactivator signal. According to some example embodiments, the example method may comprise transitioning from the alarm state to a disarmed state in response to deactivator sensor indicating that the deactivator signal has been received by the deactivator sensor, and controlling the sounder to discontinue output of the audible alarm. In the disarmed state, the processing circuitry is configured to take no action in response to further movement of the plunger.

The embodiments presented herein are provided as examples and therefore the associated inventions are not to be limited to the specific embodiments disclosed. Modifications and other embodiments are intended to be included within the scope of the appended claims. Moreover, although the foregoing descriptions and the associated drawings describe example embodiments in the context of certain example combinations of elements and/or functions, different combinations of elements and/or functions may be used to form alternative embodiments. In this regard, for example, different combinations of elements and/or functions other than those explicitly described above are also contemplated. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments.

That which is claimed:

1. A security device comprising:
   a housing comprising a base plate, the base plate comprising an aperture;
   an adhesive pad having a first pad surface and a second pad surface, the first pad surface and the second pad surface comprising an adhesive, the first pad surface being affixed to the base plate and the second pad surface being configured for application to a retail product to secure the security device to the retail product;
   a plunger switch comprising a plunger that is configured to be in a depressed position or in an extended position where the plunger extends through the aperture, the plunger switch configured to output a plunger switch signal in response to the plunger being in a depressed position or an extended position;
   a protective backing coupled to the second pad surface of the adhesive pad, the protective backing being positioned to maintain the plunger in the depressed position, the protective backing being removable to expose the second pad surface for application of the security device to the retail product;
   a sounder configured to controllably output an audible alarm sound;
   a deactivator sensor configured to receive a deactivator signal; and
   processing circuitry coupled to the plunger switch, the deactivator sensor, and the sounder, the processing circuitry being configured to control operation of the sounder based on a current state of the processing circuitry;
   wherein, when the protective backing is maintaining the plunger in the depressed position, the processing circuitry is in an inventory state;
   wherein, in the inventory state, the processing circuitry is configured to take no action in response to the deactivator sensor detecting a deactivator signal.

2. The security device of claim 1, wherein the adhesive pad is formed of a sheet with a window disposed therein to permit passage of the plunger through the window when the plunger is in the extended position.

3. The security device of claim 2, wherein the window in the adhesive pad aligns with the aperture in the base plate.

4. The security device of claim 3, wherein the protective backing overlaps the window in the adhesive pad and the aperture in the base plate to maintain the plunger in the depressed position.

5. The security device of claim 1, wherein the plunger is spring-biased to be in the extended position.

6. The security device of claim 1, wherein the plunger switch is the only mechanical actuating input to the processing circuitry.

7. The security device of claim 6, wherein movement of the plunger from the depressed position to the extended position in response to removal of the protective backing is the only action that causes that processing circuitry to transition from the inventory state to a ready to arm state;
   wherein, in the ready to arm state, a subsequent movement of the plunger into a depressed position transitions the processing circuitry into an armed state where the processing circuitry is configured to control the sounder to output an audible alarm in response to the plunger returning to the extended position.

8. The security device of claim 1, wherein the processing circuitry is configured to:
   monitor the plunger switch signal to determine when the plunger moves into the extended position due to removal of the protective backing from the adhesive pad; and
   transition into a ready to arm state in response to the plunger switch signal indicating that the plunger has moved into the extended position.

9. The security device of claim 8, wherein the processing circuitry is further configured to transition from the ready to arm state to an armed state in response to the plunger switch signal indicating that the plunger has moved into the depressed position;
   wherein, in the armed state, the processing circuitry is configured to control the sounder to output an audible alarm in response to plunger switch signal indicating that the plunger has returned to the extended position.

10. A method performed by a security device to transition from an inventory state, the security device comprising:
    a housing comprising a base plate, the base plate comprising an aperture;
    an adhesive pad having a first pad surface and a second pad surface, the first pad surface and the second pad surface comprising an adhesive, the first pad surface being affixed to the base plate and the second pad surface being configured for application to a retail product to secure the security device to the retail product;
    a plunger switch comprising a plunger that is configured to be in a depressed position or in an extended position where the plunger extends through the aperture, the plunger switch configured to output a plunger switch signal in response to the plunger being in a depressed position or an extended position;
    a protective backing coupled to the second pad surface of the adhesive pad, the protective backing being positioned to maintain the plunger in the depressed position, the protective backing being removable to expose the second pad surface for application of the security device to the retail product;
    a sounder configured to controllably output an audible alarm sound;
    a deactivator sensor configured to receive a deactivator signal; and
    processing circuitry coupled to the plunger switch, the deactivator sensor, and the sounder, the processing circuitry being configured to control operation of the sounder based on a current state of the processing circuitry;
    wherein, when the protective backing is maintaining the plunger in the depressed position, the processing circuitry is in an inventory state;
    wherein, in the inventory state, the processing circuitry is configured to take no action in response to the deactivator sensor detecting a deactivator signal;
    the method comprising:
    monitoring, by the processing circuitry, the plunger switch signal to determine when the plunger moves into the extended position due to removal of the protective backing from the adhesive pad; and
    transitioning the processing circuitry into a ready to arm state in response to the plunger switch signal indicating that the plunger has moved into the extended position;
    wherein, in the ready to arm state, a subsequent movement of the plunger into the depressed position causes a transition into an armed state.

11. The method of claim 10 further comprising transitioning from the ready to arm state to the armed state in response to the plunger switch signal indicating that the plunger has moved into the depressed position;
    wherein, in the armed state, the processing circuitry is configured to control the sounder to output an audible alarm in response to plunger switch signal indicating that the plunger has returned to the extended position.

12. The method of claim 11 further comprising transitioning from the armed state to an alarm state in response to the plunger switch signal indicating that the plunger has subsequently moved into the extended position;
    wherein, in the alarm state, the processing circuitry controls the sounder to output the audible alarm and the processing circuitry monitors the deactivator sensor for receipt of a deactivator signal.

13. The method of claim 12 further comprising:
    transitioning from the alarm state to a disarmed state in response to deactivator sensor indicating that the deactivator signal has been received by the deactivator sensor; and
    controlling the sounder to discontinue output of the audible alarm;
    wherein, in the disarmed state, the processing circuitry is configured to take no action in response to further movement of the plunger.

* * * * *